United States Patent [19]

Hoadley et al.

[11] Patent Number: 4,619,747

[45] Date of Patent: Oct. 28, 1986

[54] ELECTROFILTER PROCESS USING RECIRCULATING ELECTROLYTE

[75] Inventors: Jonathan K. Hoadley, Stamford; Mark P. Freeman, deceased, late of Darien, both of Conn., by Helen M. Freeman, executrix

[73] Assignee: Dorr-Oliver, Stamford, Conn.

[21] Appl. No.: 719,921

[22] Filed: Apr. 3, 1985

[51] Int. Cl.$^4$ .............................................. B01D 13/02
[52] U.S. Cl. ............................. 204/182.3; 204/182.2; 204/182.4; 204/151; 204/152; 204/301
[58] Field of Search ......................... 204/182.2–182.4, 204/149, 151, 152, 301

[56] References Cited

U.S. PATENT DOCUMENTS

| | | | |
|---|---|---|---|
| 4,048,038 | 9/1977 | Kunkle | 204/182.2 |
| 4,132,626 | 1/1979 | Kunkle | 204/301 |
| 4,168,222 | 9/1979 | Freeman | 204/182.2 |
| 4,207,158 | 6/1980 | Freeman | 204/182.2 |
| 4,312,729 | 1/1982 | Wills | 204/182.2 |
| 4,432,860 | 2/1984 | Bachot et al. | 204/296 |

Primary Examiner—John F. Niebling
Assistant Examiner—Terryence Chapman
Attorney, Agent, or Firm—Burtsell J. Kearns; Paul D. Greeley; Gary R. Plotecher

[57] ABSTRACT

An electrofiltering process for dewatering or separating particles from a liquid or a colloidal suspension, which comprises the use of an electrofilter with separated, submerged electrodes, consisting of a cathode assembly and an anode assembly, wherein the filtrate is recirculated from the cathode assembly of the electrofilter into the anode assembly where it is utilized as anolyte. An initial electrolytic solution containing a soluble compound of an alkali or alkaline earth metal, such as NaOH or NaHCO$_3$, is added to the anode assembly as anolyte. A direct current is applied to the electrofilter, so that negatively charged particles in the suspension will migrate towards the anode assembly and form a caked deposit or slurry layer on the outside of the assembly. Simultaneouslly, the electrode reactions at the cathode will split water into hydrogen gas and hydroxide. This hydroxide is diluted with filtrate passing into the cathode assembly. The resulting hydroxide solution/filtrate is recirculated to the anode assembly where it is neutralized by acid, H$^+$, generated at the anode by hydrolysis of water, to produce water. Alkaline ions which are associated with hydroxide solution filtrate for charge neutrality are transported from the cathode assembly to the anode assembly with the hydroxide solution filtrate. There they migrate from the anode assembly through the suspension and back into the filtrate under the influence of the electric field. They are spectator ions and do not enter into the anode or cathode reactions. Recirculation of the filtrate to the anolyte reduces electrofiltration operating costs and results in a superior filtered product.

11 Claims, 2 Drawing Figures

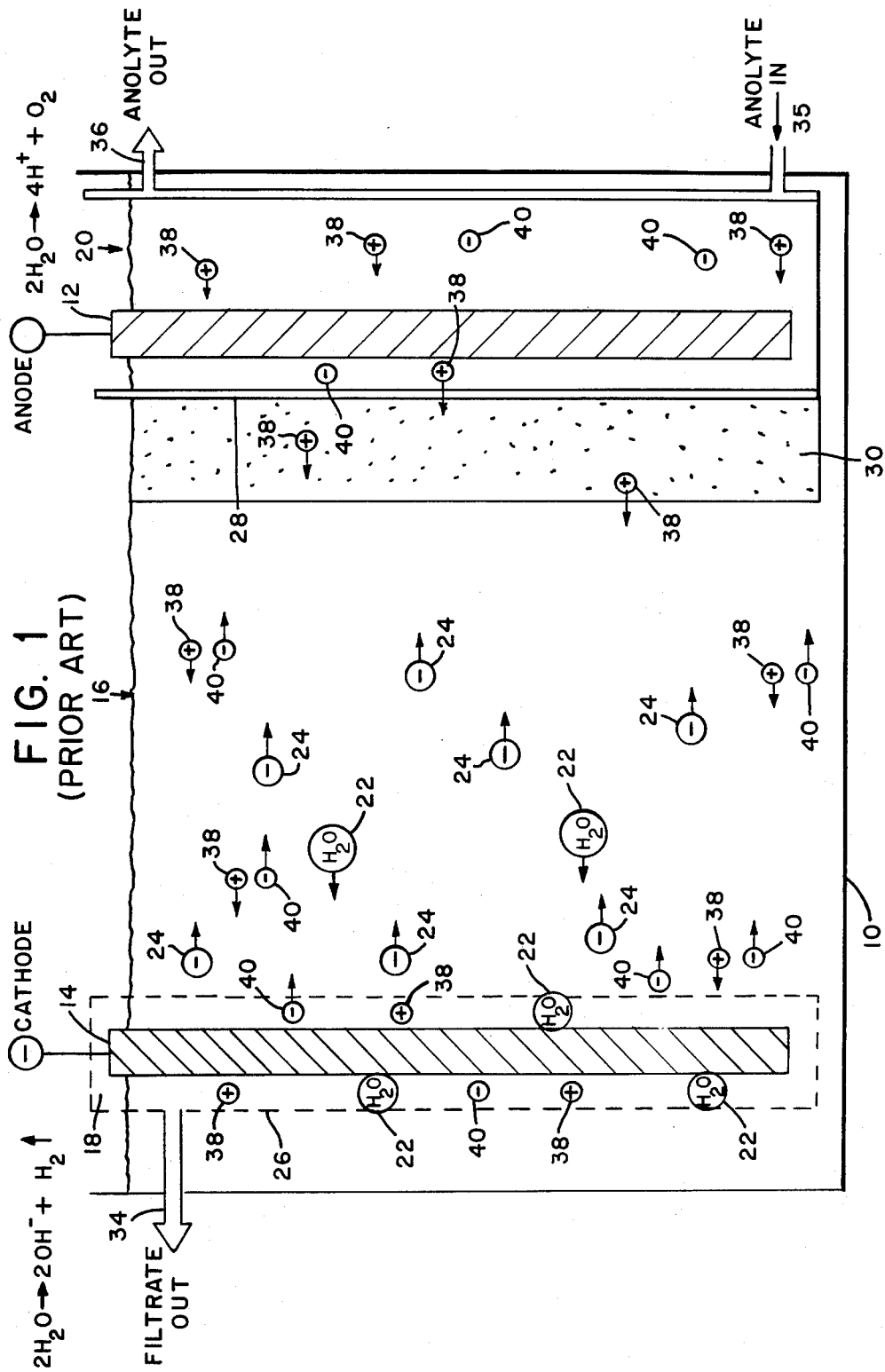

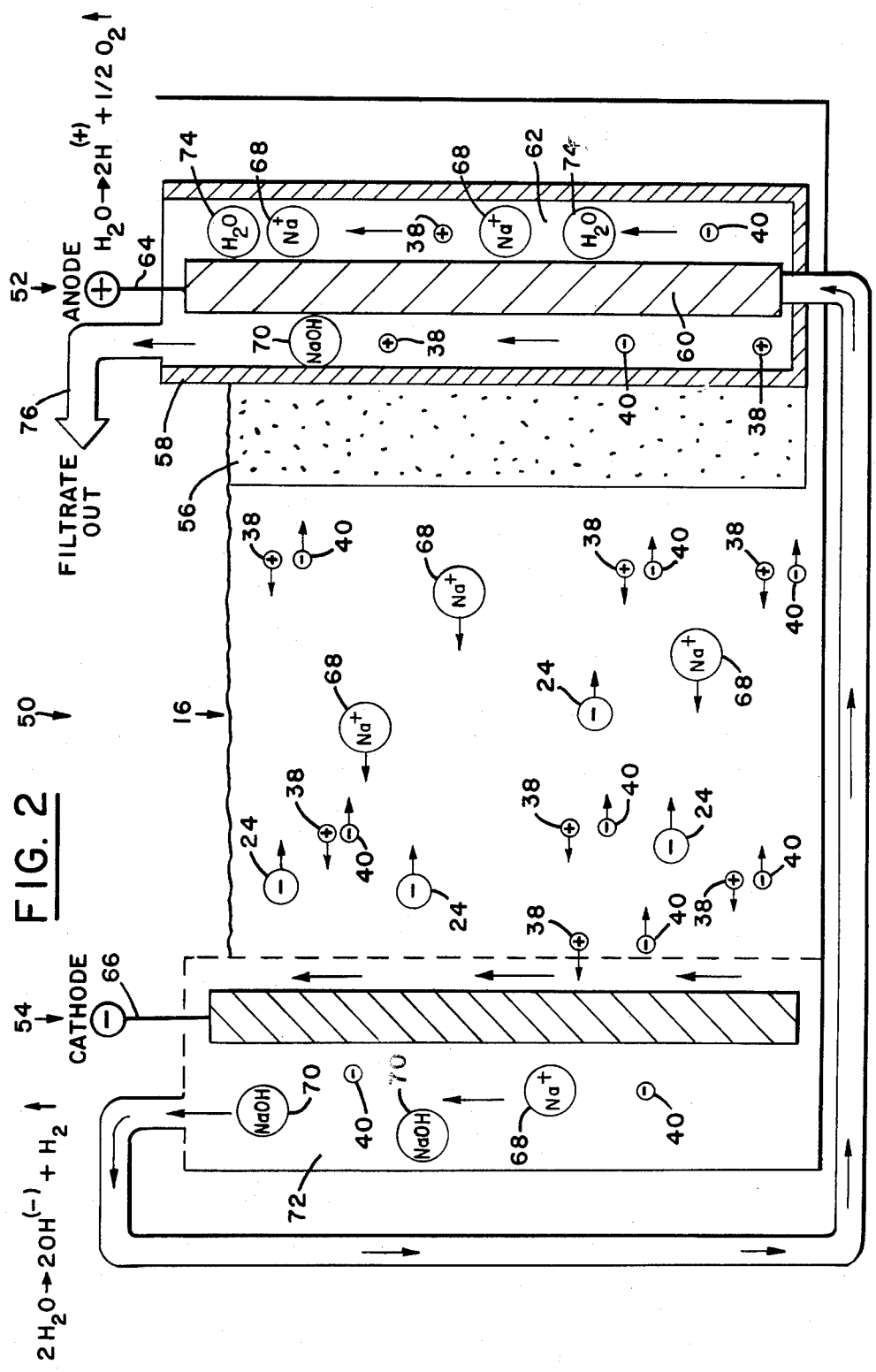

ELECTROFILTER PROCESS USING RECIRCULATING ELECTROLYTE

BACKGROUND OF THE INVENTION

This invention relates to an electrofiltering process for dewatering or separating particles from a liquid or colloidal suspension, by the use of an electrofilter wherein the catholyte is recirculated from the cathode to the anode.

Almost every particle occuring in nature has an inherent electrical charge. This charge can be utilized to achieve a separation as in electrophoresis. Electrophoresis is the movement of charged particles in a conductive liquid or colloidal suspension within an electric field. Charge on the particles may be altered by changing the pH, conductivity, temperature, or composition of the solution to be separated. Electroosmosis is the movement of water molecules towards the cathode as a function of an applied electrical force. The rate of movement of the particles or molecules is generally directly proportional to the amount of applied current.

An electrochemical cell is formed by the juxtaposition of electronic and electrolytic conductors so that as electricity is passed from the electronic conductor, such as a metal, to the electrolytic conductor, such as an acid, base, or salt solution, a chemical reaction occurs at their interface. The electronic-electrolytic interface at which oxidation occurs is known as the anode or positive electrode and that at which reduction occurs is known as the cathode or negative electrode.

When charged particles are placed between the anode and cathode of the electrochemical cell, the particles will tend to migrate towards an electrode as a function of their charge. This process is called electrophoresis. For example, kaolin clay particles are negatively charged so they migrate towards the anode. Accordingly, a kaolin clay suspension can be "dewatered" by placing the clay suspension within an electrochemical cell and applying a direct current. The clay particles settle or deposit on the anode surface and on each other, displacing water or liquid molecules electroosmotically to form a more dense cake layer or slurry with a higher solids content than that of the liquid or aqueous suspension. The anode is removed from the cell and the dense layer of clay particles is recovered by removing the layer from the anode. The water is collected or removed at the cathode.

Since the rate of migration of the particles is a function of current density, it would seem desirable to apply as much current as possible. However, since the generation of acid ($H^+$) and base ($OH^-$) by hydrolysis of water molecules and the amount of oxidation at the anode is proportional to the amount of current, the applied current must be limited to reduce these reactions which would otherwise shorten the electrode life.

An example of a dewatering system utilizing the method of placing a suspension between electrodes and applying an electrical current is described by U.S. Pat. No. 4,367,132 to Bell et al. In this method, dewatering of chemically precipitated sludge is achieved by passing direct electric current through the sludge between a pair of submerged perforated electrodes. As a result of this treatment, the liquid phase of the sludge flows by electroosmosis towards the cathode where it is collected after passing through the perforated cathode. Additional liquid is accumulated at the perforated anode where it diffuses as the sludge solids accumulate on the anode. Since the anode may be consumed in the process, the perforated electrodes used in this method are relatively simple metal sheets preferably constructed of low cost materials such as iron, aluminum or graphite. The electrodes are optionally covered with a liquid porous, non-conductive membrane made of a material such as polypropylene or rayon fabric to prevent the sludge material from clogging the electrode. (See column 5, lines 5-27 of the '132 patent.)

In an important commercial application of electrofiltration, as applied to the separation of kaolin clay particles, it has been found that a titanium electrode, in the form of a sheet to which an expensive protective coating of an acid and oxidation/resistant conductive metal is applied, is the only electrode that is practical. This electrode is very expensive because it is formed of titanium and the protective coating of acid and oxidation resistant metal costs about $100 per square foot. The function of the coating is, of course, to protect the titanium backbone from the corrosive environment of the electrofilter. In practice, however, the protective coating material does slowly erode, revealing the titanium backbone which then erodes. The replacement cost of these electrodes is substantial. It is therefore desirable to decrease the corrosiveness of the electrode environment.

Another problem which arises with the last-described apparatus is the eventual intrusion of ions, such as $H^+$ and $OH^-$, generated respectively at the positive and negative electrodes, into the electrolyte flowing into the working space. The presence of these ions in the working space alters the conductivity of the electrolyte and diffuses into the kaolin clay cake. In particular, movement of $H^+$ ions from the anode towards the cathode causes a problem with acid "floccing" of the kaolin clay which results in the formation of an acid cake.

One solution in the prior art to this problem was to continually replenish the anolyte to remove the reaction products such as $OH^-$ and $H^+$. the continual replenishment of anolyte adds operating difficulties and expense to the operation.

Both the anode element and the anolyte are usually contained within an ion-selective membrane shell so that the $OH^-$ ions from the hydrolyzed water may not travel from the cathode back to the anode and the liquid in the anolyte is prevented from exiting the anode assembly. It is critical to choose the membrane carefully to accomplish such selective ion transport at the anode assembly. Even with great care in the selection, however, the ion-selective membrane forming the outer compartment of the anode assembly is not a perfect barrier for retaining the anolytic solution added into it, so that some of the anolytic ions migrate through the membrane wall into the liquid or aqueous suspension. Often, the anolytic ions become trapped within the cake or slurry layer and remain there which can have deleterious effects on the filtered product.

It is therefore an object of the present invention to provide an efficient and inexpensive process for the dewatering or separation of particles from a liquid or colloidal suspension which produces a superior filtered product.

Accordingly, it is an object of the present invention to provide an electrofiltering process wherein the electrolyte is recirculated to neutralize reaction products and decrease the need for readjustments of the pH and conductivity of the electrolyte.

Still a further object of the present invention is to provide an electrofiltering process wherein the catholyte is recirculated into the anolyte to avoid acid precipitation of the separated solids and thereby improve the nature of the product collected at the electrode assembly.

SUMMARY OF THE INVENTION

To overcome the problems of the prior art, the electrofiltering process of the present invention recirculates catholyte from the cathode area of an electrofilter into the anolyte at the anode assembly.

The electrofiltering process of the present invention dewaters or separates particles in a liquid or colloidal suspension, by utilizing the inherent charge of the suspended particles. For example, in the dewatering of kaolin clay, the clay particles have a negative charge and will migrate towards the anode assembly when an electric current is applied to the electrofilter by means of the submerged, spaced electrodes. The clay particles build up on the outside surfaces of the anode assembly, forming a cake or slurry layer, which may be removed when the anode assembly is taken out of the electrofilter cell. The electric current hydrolyzes some of the water molecules into $H^+$ ions and $OH^-$ ions at the electrodes so that hydrogen gas is generated at the cathode and oxygen gas is generated at the anode.

An initial electrolytic solution, containing a soluble compound of an alkali metal or an alkaline earth metal, is placed into the inner compartment of an anode assembly of an electrofilter. The ionized metals, such as $Na^+$, exit the anode assembly through a membrane or filter wall, and migrate towards the cathode. At the cathode, the alkaline ions form hydroxide compounds, such as NaOH. The resulting hydroxide filtrate solution is removed from the cathode area of the electrofilter and added to the anolyte. There, the hydroxide solution is neutralized by the acid produced at the anode to form water molecules and alkaline ions, such as $Na^+$, which may again migrate towards the cathode.

The electrofiltering process of the present invention is an improvement over the prior art due to its recirculation of filtrate as anolyte. This recirculation eliminates or reduces the need for replenishing the anolyte in the anode assembly with fresh electrolyte, thus lowering operating costs. Additionally, the product is superior due to less acid diffusions in the filter cake.

BRIEF DESCRIPTION OF THE DRAWING

FIG. 1 is a cross-sectional representation of a prior art electrofilter with a coated titanium electrode with a Nafion TM membrane shell and illustrating the formation of a dewatered filter cake on the shell; and FIG. 2 is a cross-sectional representation of an electrofilter, useful for the electrofiltering process of the present invention, containing a cathode and an anode assembly, spaced and submerged in an aqueous suspension, with recirculation of the filtrate from the cathode to the anode assembly, and illustrating the formation of a dewatered filter cake on the outside of the anode assembly.

DESCRIPTION OF THE PREFERRED EMBODIMENT

The present invention relates to an improved electrofilter process which can be used for the dewatering or separation of particles in a liquid or colloidal suspension.

An example of a prior art cell for dewatering a suspension of kaolin clay in water is shown in FIG. 1. A rectangular treatment vessel 10 contains a pair of metal electrodes comprising an anode 12 and a cathode 14. The electrodes are vertical and extend laterally across the vessel 10 to define a treatment area 16. The anode 12 is composed of a sheet of titanium covered with an acid and oxidation resistant metal alloy coating, and is protectively located within a Nafion TM membrane shell 28. The membrane shell 28 retains the anolyte 20. The cathode 14 is composed of a conductive metal and covered with a liquid porous membrane 26 such as polypropylene or rayon fabric which defines a cathode area 18. A sufficient quantity of liquid suspension is pumped into the treatment area 16 to at least partially fill the vessel 10 and provide a path for the electric current between the anode 12 and the cathode 14. The electroosmotic force generated causes water molecules 22 to slow towards the cathode area 18. The electrophoretic force generated causes the movement of the suspended, negatively charged solids 24 towards the anode 12.

The solids 24 collect on the anode membrane 28 to form a solid cake 30. Anolyte is circulated by external means through port 35 into anolyte chamber 20 and out through port 36. Water is removed through port 34 as it accumulates in the cathode area 18. This also provides for the removal of hydrolysis reaction products, $H^+$ 38 and $OH^-$ 40, as they are generated by hydrolysis at the anode 12 and the cathode 14, respectively. $H^+$ ions 38 are shown trapped within the cake 30 as they migrate from the anode 12 to the cation permeable Nafion TM membrane 28 towards the cathode 14.

The collected solids material is removed periodically from the anode membrane 28 so the collection/concentration process may be repeated. Fresh electrolyte is also added periodically to the recirculated anolyte in the anode area 20 so the process can continue to operate.

An electrofilter 50, useful for an electrofiltering process of the present invention, is illustrated in FIG. 2. This drawing shows electrodes, an anode 52 and as a cathode 54, spaced and submerged in an aqueous suspension 16.

In the dewatering of certain kaolin clay particles 24, which have a negative charge (as illustrated by the larger circles in the drawing), the clay particles 24 will migrate towards the anode or anode assembly 52, which has a positive charge. The clay particles 24 deposit as a cake layer 56 on a filter or membrane material 58 of the anode assembly 52 when a direct current is applied to the electrofilter 50. The anode assembly 52 contains a conductive electrode element 60 and an electrolytic solution 62. The outside compartment of the anode assembly 52 is formed from a filter, membrane, or ion selective material 58.

An electric current is applied to the electrofilter 50 by means of a conductive terminal 64 attached to the submerged anode assembly 52 and a conductive terminal 66 attached to the submerged cathode 54. This current hydrolyzes some of the water molecules into ions (as illustrated by the smaller circles in the drawing). The $H^+$ ions 38 from the hydrolysis reaction migrate towards or remain at the cathode 54, whereas the $OH^-$ ions 40 migrate towards or remain at the anode assembly 12 (direction of travel is illustrated by arrows in the drawing). Accordingly, hydrogen gas ($H_2$) is generated at the cathode 54, and oxygen gas ($O_2$) is generated at the anode assembly 52. (These cathodic and anodic reactions are shown in the drawing.) The extent of hydrolysis of water molecules depends on the amount of current applied to the electrofilter circuit.

Alkali ions 68 (illustrated by the larger Na+ circles in the drawing) from the anolytic solution 62 exit the anode assembly 52 through a filter wall 58 and migrate towards the cathode 54 (direction of travel is illustrated in the drawing). There, the alkali ions 68 combine with the OH− ions 32 produced at the cathode 14 to form a hydroxide compound, such as NaOH 70. The resulting hydroxide filtrate 72 is removed from the cathode 54 and returned to the inner compartment of the anode assembly 52 as anolyte 62. There, the hydroxide compound 70 such as NaOH is neutralized by the H+ ions 38 produced at the anode 52, resulting in alkali ions such as Na+ 68 and water 74. These alkali ions 68 can then again migrate towards the cathode 54 as previously described. The neutralized filtrate is then removed from the anode assembly 52 through the port 76.

During a dewatering operation in accordance with the present invention, and after a cake or slurry layer 56 of sufficient thickness has deposited on the anode assembly 52, the assembly 52 is removed from the electrofilter cell 50, so that the layer 56 may be removed from the membrane wall 58 of the anode assembly 52.

An anode assembly, useful for the electrofiltering process of the present invention, contains an anode element and a conductive anolyte. The outside compartment of the anode assembly is formed from a membrane material, ion selective material or filter material.

An anode element, useful for the electrofiltering process of the present invention, should be a conductive material which will not corrode easily when subjected to acid, oxidation, and heat. For a clay dewatering operation, a thin titanium sheet is useful as the anode element. Other conductive materials and structures, common to the art, may be utilized as an anode element in the electrofiltering process of the present invention. The anode element may be coated with various materials, such as platinum, a superalloy, or other non-corrosive materials, to prevent corrosion and dissolution of the anode element. In a preferred embodiment, the anode element is positioned immediately adjacent to the membrane wall where the particles are to be deposited, to minimize energy dissipation within the anode assembly. A thin plastic grid may be placed between the membrane wall and the anode element to ensure free circulation of the anolyte.

The electrode assembly is filled with an electrolyte until the electrode element is completely immersed in electrolyte and isolated from direct contact with the clay suspension. The electrolyte is specially selected for high conductivity and compatibility with the electrode element. By compatibility is meant the relative non-corrosive character of the electrolyte under the conditions that ordinarily prevail within the hollow electrode assembly. High conductivity would be in the range of 30 milliSeimens.

In accordance with the electrofiltering process of the present invention, a solution which contains a soluble compound of an alkali metal (column IA of the Periodic Table) or of an alkaline earth metal (column IIA of the Periodic Table) is placed in the inner compartment of the anode assembly as anolyte. In a preferred embodiment, the initial anolytic solution contains NaOH or NaHCO$_3$, which forms sodium ions in water. The alkali metal ions or alkaline earth metal ions which are employed in the initial anolytic solution should be capable of forming soluble hydroxides. As the electrolytic process proceeds, it may be necessary to add additional amounts of these alkaline compounds to make up for any alkaline ion losses which might occur during the normal course of operation of the electrofiltering process.

Various membrane or filter materials, common to the art, may be utilized to form the outside walls of the anode assembly, in accordance with the process of the present invention. The membrane material may be composed of a cast permeable plastic filter coated on cloth. The plastic may be filled with an ion exchange material to promote conduction. To form such a material a quantity of fine particles of an ion exchange resin is mixed with an organic binder and an organic solvent to form a mixture in which the particles of ion exchange resin are in suspension, impregnating a strong, fibrous, relatively inert, porous substrate with the resin-binder-solvent mixture, contacting the impregnated fabric with a diluent characterized by a high degree of miscibility with the organic solvent and a sufficiently low degree of compatability with the organic binder to effect a rapid precipitation of the binder from solution, maintaining the diluent in contact with the impregnated fabric until substantially all of the binder has precipitated to form a matrix bonding the particles of ion exchange resin to the fabric and each other, forming an essentially continuous film of ion exchange resin on the fabric and in the interstices thereof.

The fabric substrate may be either woven or unwoven. Dynel (a trademark of Union Carbide Company for a copolymer of vinyl chloride and acrylonitrile) fibers, polypropylene fibers or glass fibers, which are inert in the contemplated systems, may be used to provide the strong, inert fabric required.

A cross-linked sulfonated polystyrene (sold by Rohm and Haas under the trade designation Amberlite) has been proven to be a satisfactory ion exchange resin for this application, but other ion exchange resins such as sulfonated polyphenylene sulfides may also be employed. These resins are available in particle form. The particles of ion exchange resins should be very fine, preferable of a 325 mesh (Tyler mesh series).

An organic binder such as Kyner (a trade designation of Pennwalt Chemical Company for polyvinylidene fluoride) is employed to bind the ion exchange resin particles to the fabric and to each other.

The solvent is preferably DMAC (dimethylacetamide), but DMF (N,N′-dimethylformamide) and N-2 Pyrrolidinone may also be employed.

The diluent is preferably water, but, in some cases, a mixture of water and an organic solvent and/or surfactants may be used.

The mixture of resin particles, binder and solvent may be applied to the fabric substrate by painting (brush, roller, spray, etc.), coating, casting or dipping.

The diluent is preferably brought into contact with the solvent by dipping. Following precipitation of the organic binder, the coated fabric may be air dried, but this is not always necessary and, in fact, in some cases it is preferable to maintain the coated fabric in a moist condition because the material is more flexible when moist.

In another preferred embodiment, the anodic membrane material contains a coating such as a synthetic rubber or latex electrodeposited on the membrane and then vulcanized in situ.

During an electrofiltering process, in accordance with the present invention, the alkali metal ions or alkaline earth metal ions exit the inner compartment of the anode assembly, through the membrane wall, and migrate towards the cathode. When these alkaline ions reach the cathode, they associate with the OH⁻, generated from the hydrolysis of water, to form a hydroxide. When sodium ions are utilized in the electrofiltering process of the present invention, this chemical reaction is as follows:

The resulting hydroxide filtrate solution is removed from the cathode end of the electrofilter and recirculated back into the inner compartment of the anode assembly. Removal of the filtrate may be accomplished by various means, common to the art, such as by the use of a vacuum system. In a preferred embodiment, a filter cloth is placed around the cathode to prevent small particles in the liquid suspension from being introduced into the catholyte. Otherwise, since the clay particles in the feed material are of colloidal particle size, a significant amount of such clay particles would accumulate in the chamber of the electrode assembly, contaminate the electrolyte circulating through the clay and restrict and block flow of electrolyte through the electrode chamber. These particles may also be corrosive to the cathode element, so a filter cloth serves the further purpose of keeping the particles from contacting the cathode element.

In the event that the removed filtrate contains particulate matter, the filtrate may be clarified by means of a filter, sedimentation, or other means common to the art, prior to adding the filtrate into the anode assembly. If undesirable ions are present in the filtrate, which might be corrosive to the anode element or coating, or which would produce deleterious intrusions in the filter cake product, the ions may be precipated out and removed by clarification means, common to the art.

The hydroxide filtrate solution is then added to the inner compartment of the anode assembly, in accordance with the process of the present invention. There, the hydroxide solution is neutralized to form alkaline ions. For example, when sodium ions are utilized in the process of the present invention, the anodic reaction for neutralization of the NaOH is as follows:

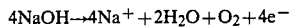

The resulting sodium ions may then again exit the anode assembly and migrate towards the cathode. Due to the recirculation of the filtrate, it is not necessary to continually replenish the anolytic solution as in prior art anode assemblies. Additional conductive solution may be added to the anode compartment to make up for insufficient conductivity or anolyte flow.

The anode assembly of the present invention may be taken out of the electrofilter for periodic removal of the cake or slurry. Removal of the cake or slurry may be performed by scraping, spraying, doctoring or by other means common to the art. There may be several such anode assemblies, preferably positioned in series, which can be individually removed, or removed as a unit. A grid or screen may be positioned on the outer face of the membrane material, so that the membrane will not be damaged when the filter cake or slurry is removed.

A cathode which is useful in a dewatering operation in accordance with the present invention consists of an electrode or cathode element surrounded by a filter cloth or liquid-pervious membrane material. The electrode element is a conductive material and is attached to an electrically conductive terminal for connection to an electric current source. The filter cloth or liquid-porous membrane should be selected to allow the liquid and alkaline ions in the suspension to pass through the membrane, while preventing the particles in suspension, such as clay particles, from passing through the membrane wall, e.g. polypropylene fabric, dynel fabric or rayon fabric, etc.

An electrofilter, used in accordance with the process of the present invention, is subjected to an electric current by means of terminal connections with the anode assembly and cathode. The current may be varied to increase or decrease the filtering rate.

Accordingly, it has been discovered that an electrofiltering process, which recirculates the filtrate from the cathode end of an electrofilter to the anode end, provides an inexpensive and efficient system for separating or dewatering particles from a liquid or colloidal suspension and resulting in a superior filtered product. Due to the recirculation of the filtrate as anolyte, it is not necessary to continually replenish the anolyte in the anode assembly with fresh electrolytic solution.

While the invention has been described with reference to its preferred embodiment, other embodiments can achieve the same results. Variations and modifications of the present invention will be obvious to those skilled in the art and it is intended to cover in the appended claims all such modifications and equivalent as follows in the true spirit and scope of this invention.

What is claimed is:

1. A process for the dewatering or separation of particles in an aqueous suspension by means of an electrofilter, comprising the following steps:
   a. submerging at least an anode assembly, said anode assembly comprising an anode, anolyte chamber and a membrane wall, and a cathode assembly, said cathode assembly comprising a cathode, catholyte chamber and a membrane wall, of said electrofilter into said aqueous suspension for the purpose of depositing a cake of said particles onto said anode assembly and withdrawing filtrate at said cathode assembly;
   b. supplying an initial amount of electrolytic solution containing soluble compounds of an alkali metal or alkaline earth metal to said anolyte chamber of said anode assembly of the electrofilter, such that ions from the soluble compounds of alkali metal or alkaline earth metal are transported across the membrane or filter wall of said anode assembly and migrate through said aqueous suspension towards said cathode assembly;
   c. transporting said alkali metal ions or alkaline metal earth ions, together with the filtrate from said aqueous suspension, through the membrane or filter wall of said cathode assembly into said catholyte chamber, such that said alkali metal ions or alkaline metal earth ions react with OH⁻, produced at the cathode by a reaction between said filtrate and the cathode, to form a hydroxide solution; and
   d. recirculating a solution comprising said filtrate and hydroxide solution from said cathode assembly to said anolyte chamber of the anode assembly; whereby said hydroxide solution breaks down at the anode to form alkali metal ions or alkaline earth metal ions and OH⁻ ions for neutralizing the reaction products at said anode.

2. An electrofiltering process in accordance with claim 1, wherein the initial electrolytic and hydroxide solution contains NaOH or NaHCO$_3$.

3. An electrofiltering process in accordance with claim 1, wherein the filtrate solution is further clarified after being removed from the cathode and prior to being added into the anode assembly.

4. An electrofiltering process in accordance with claim 1, wherein the filtrate and hydroxide solution is further sent to a receiving tank after being removed from the cathode and prior to being added into the anode assembly.

5. An electrofiltering process in accordance with claim 1, wherein the filtrate and hydroxide solution is removed from the cathode by means of a vacuum.

6. The anode assembly of claim 1, wherein the membrane wall comprises an ion exchange resin embedded in a fabric.

7. The anode assembly of claim 1, wherein the membrane wall comprises a coating of electrodeposited, vulcanized synthetic rubber.

8. The electrofiltering process in accordance with claim 1, wherein said cathode is surrounded by a liquid-porous membrane.

9. The electrofiltering process in accordance with claim 8, wherein said liquid-porous membrane permits the filtrate and alkaline ions to pass there-through.

10. The electrofiltering process in accordance with claim 9, wherein said liquid-porous membrane is one selected from the group consisting of polypropylene fabric, dynel fabric and rayon fabric.

11. The electrofiltering process in accordance with claim 1, wherein said filtrate is removed at the anode assembly.

* * * * *